(12) United States Patent
Plaputta et al.

(10) Patent No.: US 12,058,106 B2
(45) Date of Patent: Aug. 6, 2024

(54) COMMUNICATION SERVER AND METHOD OF OPERATION

(71) Applicant: Spark Networks Services GmbH, Berlin (DE)

(72) Inventors: Tobias Plaputta, Berlin (DE); Vineet Singla, Berlin (DE); Charles E. Gotlieb, San Juan, PR (US)

(73) Assignee: Spark Network Services GmbH, Berlin (DE)

( * ) Notice: Subject to any disclaimer, the term of this patent is extended or adjusted under 35 U.S.C. 154(b) by 0 days.

(21) Appl. No.: 18/464,449

(22) Filed: Sep. 11, 2023

(65) Prior Publication Data
US 2023/0421532 A1 Dec. 28, 2023

Related U.S. Application Data (63) Continuation of application No. 17/072,016, filed on Oct. 15, 2020, now Pat. No. 11,757,831.

(60) Provisional application No. 62/915,646, filed on Oct. 16, 2019.

(51) Int. Cl.
| | | |
|---|---|---|
| G06F 15/173 | (2006.01) | |
| H04L 12/46 | (2006.01) | |
| H04L 51/10 | (2022.01) | |
| H04L 51/214 | (2022.01) | |
| H04L 61/5014 | (2022.01) | |

(52) U.S. Cl.
CPC ...... *H04L 61/5014* (2022.05); *H04L 12/4645* (2013.01); *H04L 51/10* (2013.01); *H04L 51/214* (2022.05)

(58) Field of Classification Search
CPC .............. H04L 61/5014; H04L 51/214; H04L 12/4645; H04L 51/10
USPC ............................... 709/223, 224, 204, 226
See application file for complete search history.

(56) References Cited

U.S. PATENT DOCUMENTS

| 8,126,966 B2* | 2/2012 | Dote ...................... H04L 51/212 709/204 |
|---|---|---|
| 2008/0104219 A1* | 5/2008 | Kageyama .............. G06F 16/41 709/223 |
| 2015/0242514 A1* | 8/2015 | Simon .................... G06Q 50/01 707/740 |

* cited by examiner

*Primary Examiner* — Kaylee J Huang
(74) *Attorney, Agent, or Firm* — Innovation Partners LLC; Charles E. Gotlieb (57) ABSTRACT

A communications server selectively allows communications based on indications of compatibility of the users who wish to communicate, as evidenced by mutual selection of the same elements of content sets that apply to each of the users.

18 Claims, 4 Drawing Sheets

FIG 3

COMMUNICATION SERVER AND METHOD OF OPERATION

RELATED APPLICATIONS

This application is a continuation of U.S. patent application Ser. No. 17/072,016 entitled "Communication Server and Method of Operation", filed by Vineet Singla, Tobias Plaputta and Charles E. Gotlieb on Oct. 15, 2020, which claims the benefit of U.S. Provisional Patent Application Ser. No. 62/915,646 entitled "Communication Server and Method of Operation" filed on Oct. 16, 2019 by Vineet Singla, Tobias Plaputta and Charles E. Gotlieb, having the same assignee as the present invention and is hereby incorporated by reference in its entirety.

FIELD OF THE INVENTION

The present invention is related to computer software and hardware and more specifically to computer software and hardware for communications servers.

BACKGROUND OF THE INVENTION

Computer system user interfaces and their method of operation are suboptimal for use with communications servers. What is needed is an improved user interface for use with a computer-based communication server.

SUMMARY OF INVENTION

A user interface allows users to define one or more frames, each frame having a type corresponding to a definition, and being used as a container to hold related information.

Some or all frame types allow the user to specify content sets, some of which may include collections of related photos or answers, and then select subsets of those content sets that are most relevant to that user. For example, a user may specify a frame having a type that allows the user to select a content set of photos of activities they like, from among other content sets containing photos of other things, like restaurants, types of food, etc. The user may select that content set and then select a subset of that content set as being most relevant to that user, because they enjoy those activities from among others pictured in the selected content set, for example.

Some frame types may allow the selection of multiple content sets, and the user, referred to as a frame creator, can select each of several content sets to be included in the frame. For example, a content set may include one question and several possible answers to that question. The user can select one or more answers for each of one or more content sets that will all be part of the same frame. Each question and its possible and selected answers are then considered to be "pages" of the frame.

A communications server operates by controlling communications between users by sequentially displaying to each of many users other users having characteristics meeting a criteria specified by the user, which may include a current distance from the user, identified by receiving GPS coordinates of mobile devices of the user and the other users. If a frame user interface is employed by the communications server, when a user views information of another user, the frames of the other user are displayed to the viewing user. If the frame contains a subset of one or more content sets, the viewing user can make selections from each content set that are most relevant to the viewing user.

If there is a match between the viewing user's selections and the frame creator's selections of the one or more content sets in a frame, or in all frames for that frame creator, the communication server allows the user and the frame creator to communicate and otherwise does not allow the user and the frame creator to communicate. In one embodiment, the communication server requires a two way match: the above only applies if the other user's subset also matched the user's subset when viewing the user's frame or frames, or otherwise approved the user for messaging.

The other users may be viewed by a user via searching or browsing. The searching may be automatic, for example, when the user starts an app on his or her mobile device, and may be based on preferences of the user and characteristics of the other users, and may also be based on characteristics of the user and preferences of the other users, the distance between the user and the other users, and whether the profile of the other user has been viewed by the user. The location characteristic of the user and other users may each be received from a GPS receiver on the devices of the user and other users, of which there may be thousands or tens of thousands, and a distance preference of the user.

Search results may be ordered as a function of such characteristics and preferences, and optionally a compatibility score that is based on overlaps of subsets for the same content set that have been selected by the user and the other users, either when creating frames or otherwise.

A frame creator can thus build a profile about the user that contains any number of frames of any number of types with any number of types of content sets, that both informs other users who peruse the frames of the frame creator about the frame creator and can be used as a communications filter to filter the communications of users attempting to contact the frame creator.

The use of frames provides a simplified user interface that both facilitates both the provision of information about the frame creator and a criteria that the frame creator can use to identify whether a user who peruses the frame creator's information, is a good match for the frame creator. The user interface to perform both functions is thus simplified, and improved due to its efficiency.

In one embodiment, the selection or selections from the content sets made in frames created by the frame creator can be used as selections when the frame creator acts as a user to peruse the frames of another user having the same or similar content set, making the user interface even more efficient for a frame creator perusing the frames of other users. For example, if a content set has two or more selections of activities that the frame creator likes, the activities of two users may be matched to enable communications if a threshold number or percentage of the selections made by each such party correspond or match. A frame that corresponds to favorite activities may display icons of the one or two or more activities preferred by the frame creator. When the perusing user is also a frame creator of their own frames, if the two users defined the same activity frame and made a threshold number or percentage of selections that matched or corresponded to one another (e.g. hiking and camping may be considered to correspond because they both involve outdoor activities in nature), communications between the two users would match without the other user being required to make a selection for such frame when viewing the frame creator's frames.

DETAILED DESCRIPTION OF A PREFERRED EMBODIMENT

Figure 1:
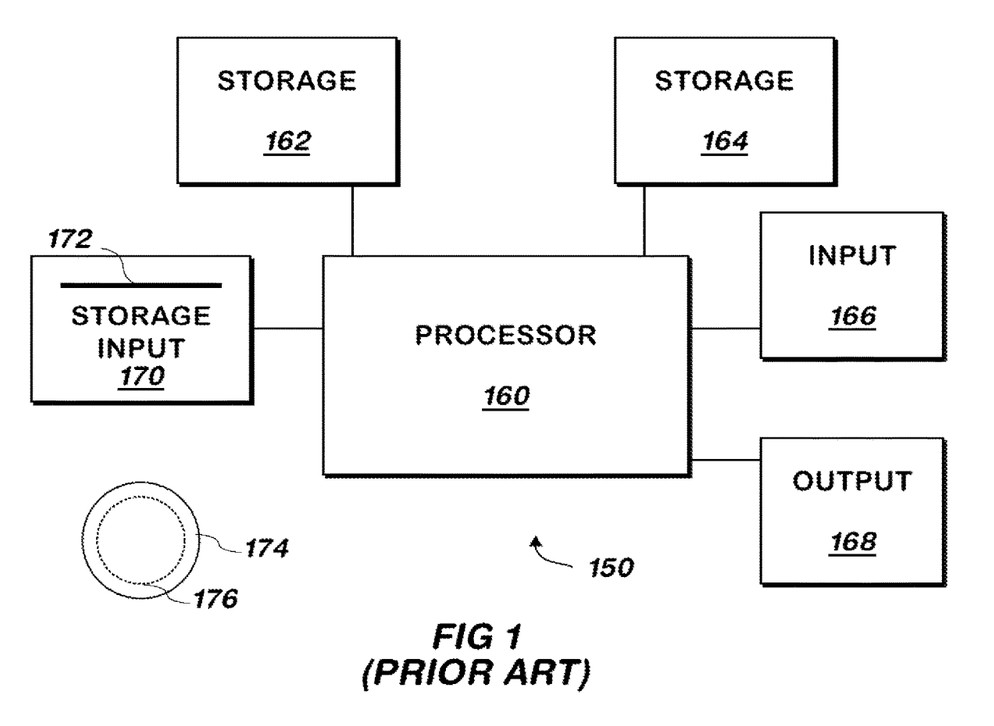
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. The components of the system described herein may be implemented via one or more hardware computer processors that operate under firmware or hardware control as described herein.

Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. All storage elements described herein may include conventional memory and/or disk storage and may include a conventional database.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional ORACLE SPARC T SERIES SERVER running the ORACLE SOLARIS operating system commercially available from ORACLE CORPORATION of Redwood Shores, California, a PENTIUM-compatible personal computer system such as are available from DELL COMPUTER CORPORATION of Round Rock, Texas running a version of the WINDOWS operating system (such as WINDOWS 10) commercially available from MICROSOFT Corporation of Redmond Washington or a Macintosh computer system running the MACOS (such as Mojave) or OPENSTEP operating system commercially available from APPLE INCORPORATED of Cupertino, California and the FIREFOX browser commercially available from MOZILLA FOUNDATION of Mountain View, California or INTERNET EXPLORER browser commercially available from MICROSOFT above, although other systems may be used. Each computer system 150 may be a SAMSUNG GALAXY S10 commercially available from SAMSUNG ELECTRONICS GLOBAL of Seoul, South Korea running the ANDROID operating system commercially available from GOOGLE, INC. of Mountain View, California. Various computer systems may be employed, with the various computer systems communicating with one another via the Internet, a conventional cellular telephone network, an Ethernet network, or all of these.

Figure 2:
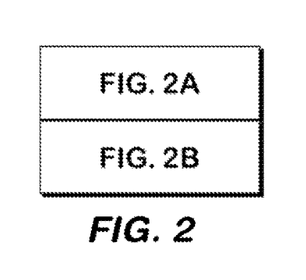
FIG. 2, consisting of FIG. 2A and FIG. 2B, is a flowchart illustrating a method of operating a communications server according to one embodiment of the present invention.
Figure 2A:
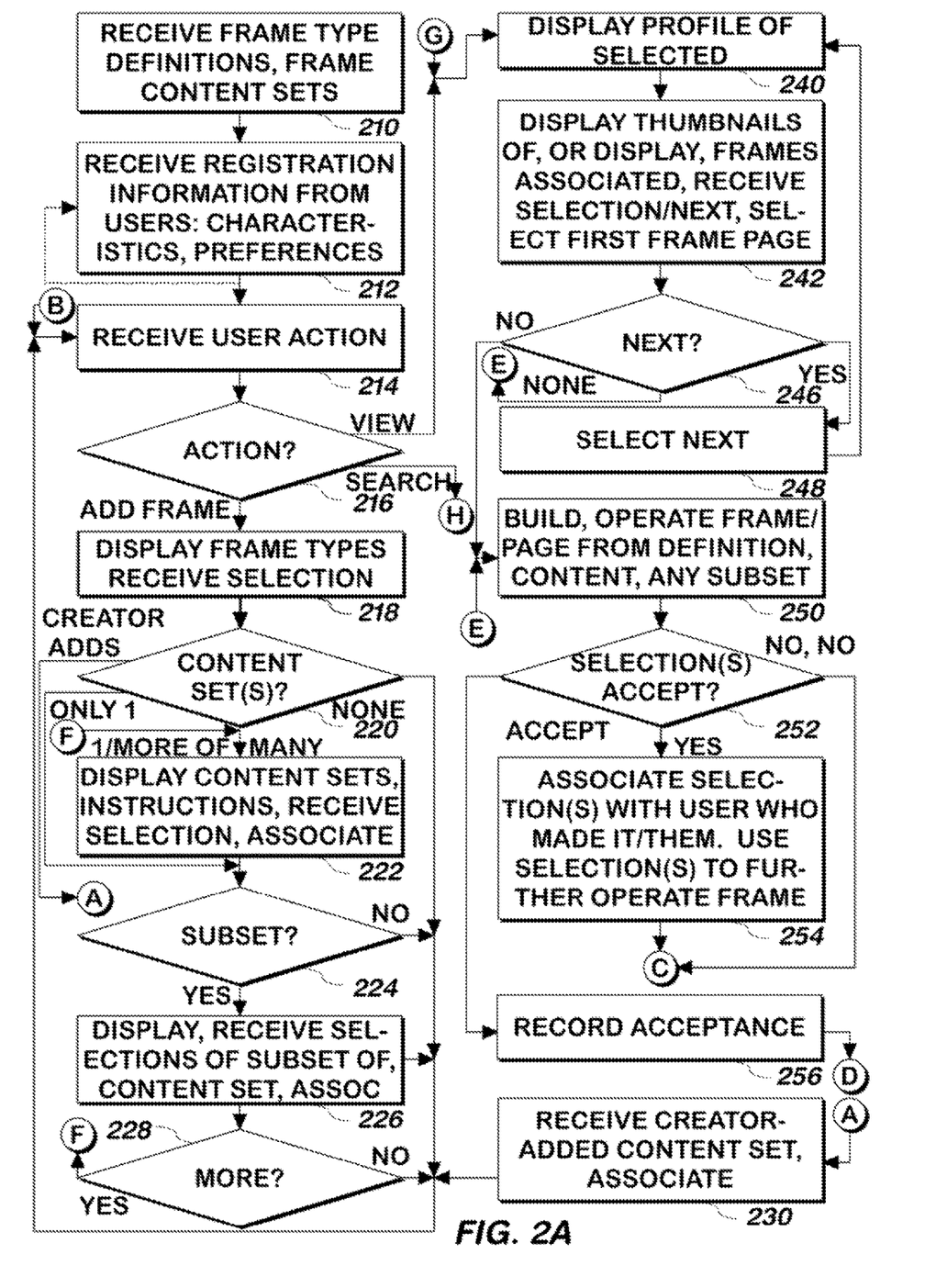
Figure 2B:
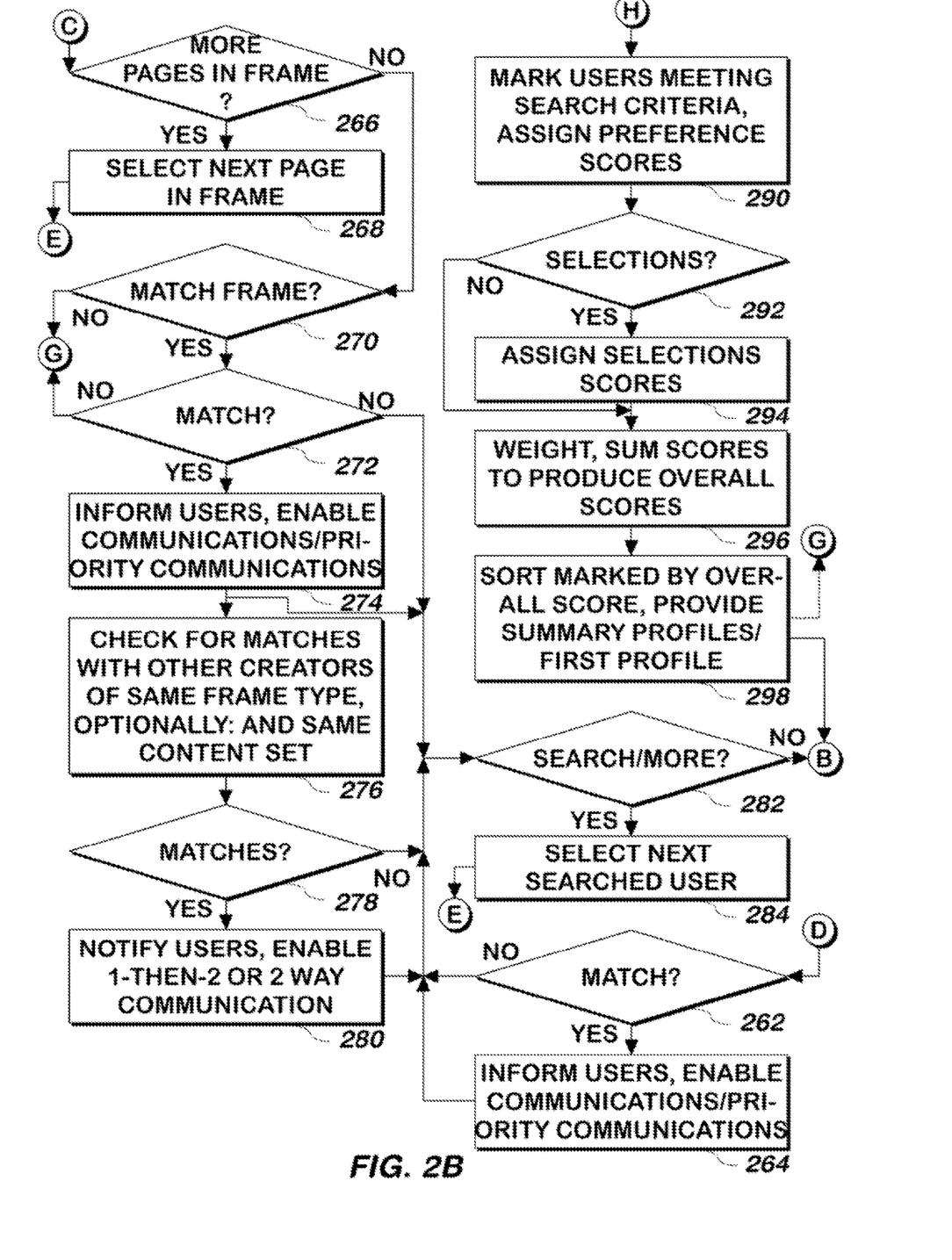

Referring now to FIG. 2, consisting of FIGS. 2A and 2B, a method of operating a communications server having hundreds, thousands, tens of thousands or hundreds of thousands or more users is shown according to one embodiment of the present invention.

Frame type definitions and content sets are received 210. A content set is any type of content, such as a photograph, a set of photographs or a set of questions and answers. A frame type definition defines the type of content set each of several frame types may hold. One frame type may hold photographs, while another frame type holds subsets of one or more of several content sets to be matched between users, described below. The frame type definition also may define how a frame having that type is to be operated when viewed by a user who is not the creator of the frame, referred to as a "frame creator".

Registration information is received from the user 212. In one embodiment, registration information includes characteristics of the user who provided it, and preferences towards other users that the user providing the registration information has. For example characteristic information may include demographic information such as the sex and sexual orientation of the user provides it, as well as the location of the user, or the location may be identified by the user's current or last known location. Preference information may include characteristics of other users in whom the user is interested, which may include a distance from the user specifying the preference information, the distance computed by identifying the location of the user using a conventional GPS receiver or allowing the user to specify it, and locations or last known locations of the other users determined in the same manner.

Define Frames

An action is received from any of several users 214. If the action is to add a frame to the profile of that user 216, any number of frame types are displayed to the user (along with explanations of the frame types and instructions to the user), who becomes a frame creator, the frame creator selects a frame type and the selection of the frame type is received and stored associated with the user. The frame type definition includes the type of content that can be added to the frame. If the type of content set or sets for the selected frame type is one or more of many content sets 220, a description and examples of each of several content sets are displayed to the frame creator, the frame creator selects one of the content sets and the selected content set is associated with the added frame 222.

In one embodiment, the frame type, or the frame type and content set, may involve the frame creator selecting a subset of the content set as described in more detail below, and if the frame type definition of the frame type selected or frame type definition for the content set selected includes a subset 224, the content set is displayed to the frame creator, and the frame creator selects a subset of the content set, which is then associated with the frame 226.

In one embodiment, multiple content sets may be specified for a frame. For example, each content set for one frame type may be potential answers to a single question, with the selected subset being the frame creator's answer or answers to the question, and multiple such question and answer content sets may be selected for a single frame of this frame type. If the frame creator wishes to specify another content set for the frame 228, the method continues at step 222, to allow the frame creator to specify another content set for the frame, with any number of content sets being able to be specified by the frame creator, to any limit of the frame type, as defined by its type definition. If the frame creator does not wish to specify more content sets for the frame (or multiple content sets are not defined for the frame type) 228, the method continues at step 214. Any number of frames may be added by each of any number of frame creators in this fashion.

If the frame type definition for the selected frame includes a pre-specified content set 220, the method continues at step 224 using the pre-specified content set. If the content set for the frame type selected includes user added content 220, the frame creator provides the content, which is received and associated with the frame 226. Any number of frame creators may define frames to be associated with that frame creator, as described herein via user interfaces provided as described.

Some examples of frame types and content sets will now be described. One frame type is a photo selection type. The user selects the photo selection type and then is presented with content sets that are photos of things the user likes. Each content set may contain related photos, such as one content set being photos of activities, with the user being able to select a subset of the one or more of the photos of activities they mike to do. Another content set may contain photos of meals or dishes at restaurants, with the user selecting the subset of photos corresponding to their favorites. Another frame type can be a photo, or poem, the user uploads. Still another frame type may be the question and answers, with the user selecting all or a subset of the answers to a single question as being answers the user agrees with regarding the question, the question and all of the answers being one content set.

View

If the action in step 214 is for a user to view information about a frame creator or other user, a profile of the frame creator is provided for display 240, the display being made as part of a mobile phone app or a website, in two such embodiments. In one embodiment, the action to view is made for the first user in a search. The search may be any user whose characteristics match the preferences of the user performing such viewing, and not already shown to such user, and for whom the preferences of that user matches the characteristics of the user for whom the search is made, or it may be a manual search the user requests, and then clicks on after viewing some or all of the profile information of each other user whose profile information matches that specified in the search request.

The selection of a frame creator may take place automatically, with the profile of a first frame creator or other user being selected from among frame creators searched who have a profile displayed having characteristics corresponding to the user's preferences, and who have not been viewed by the user previously, or it may be selected manually when a summary of a particular frame creator or other user has been selected, for example, by clicking on a link for one of several frame creators and/or other users displayed as a result of a search that the user specifies and manually requests. The first frame creator or other user automatically selected may be selected at random, or using an order described herein.

In one embodiment, not all users are frame creators, and in another embodiment, they are.

The profile of a frame creator or other user may include a screen name or real first name, age, and some of the information they supply. Thumbnails of frames or a portion or all of one or more of the frames associated with the user corresponding to the profile may be provided for display 242 either as part of the profile or linked to it through a hyperlink or user interface element. The user viewing the profile may select the frame or one of the frames as part of step 242, or a first frame associated with the user may be automatically selected.

At any time as part of steps 242-268, the user viewing the profile or selected frame or a page of the selected frame, may indicate they want to stop viewing the user whose profile and/or frame or frames are displayed, and view a next frame creator. The flowchart illustrates the option to select the next frame creator or other user only at step 242 to avoid unnecessarily complicating the Figure, but such selection may be made elsewhere. If the user indicates he or she wants to see the next frame creator or other user 246, the next frame creator or other user is selected 248 and the method continues at step 240 of the newly selected frame creator. In one embodiment, the next frame creator is the next frame creator in the search. In one embodiment, if there is no next frame creator or other user, the method continues at step 214

If the user does not select the option to view the profile and other information of the next frame creator 246, the selected frame is built using the content or content set associated with it, and the frame is operated using the content set and frame definition. Each content set associated with a frame is considered to be a page of the frame and the first page of the selected frame is used in step 250 in place of the frame.

As noted, some of the content sets may be used to allow the user to match the subset of the content set associated with the page or the frame. In such embodiment, the entire content set may be operated by displaying it with a similar question or other instructions provided to the frame creator. For example, if the content set was a collection of photographs, all of the photographs may be displayed.

In another embodiment, only some of the photographs are displayed, but those displayed include all of the frame creator's subset. If the content set included answers to a question, the answers in the content set are displayed with the question. As part of the operation of some types of frames, the user viewing the frame creator's content set may make a selection of that user's subset of the displayed content set. If such a selection is made 252, in one embodiment, the selection is associated with the user who made the selection, and the frame or page may be further operated with respect to the selection or selections the user made 254. The operation of the frame or page may involve telling the user whether the user's selections matched that of the frame creator in each page, or such information may only be provided with the last page of a frame that has multiple pages.

In one embodiment, if there are no selections of subsets of any frame of the frame creator being viewed, the user may accept the frame creator as part of step 250. If the user accepts the frame creator 252, acceptance of the frame creator is associated with the user for that frame creator 256 and the method continues at step 262 of FIG. 2B. If the user neither accepts the frame creator nor selects a subset of the content set associated with the frame and page 252, the method continues at step 266 of FIG. 2B At step 266 of FIG. 2B, if there are more pages associated with the frame 266, the next page is selected 268 and the method continues at step 250 using the newly selected page. If there are no more pages 266, the method continues at step 270.

At step 270, if the frame type definition for the frame being operated involves matching the subset selected by the frame creator with the subset selected by the user for whom the frame is being operated, and the user selections did in fact match 272, the users are informed, communication between the frame creator and the user is enabled 274, for example, via an otherwise conventional chat session or e-mail messaging capabilities, or in embodiments in which communication is always enabled between such two users, communications may be enhanced, for example by displaying e-mail messages between the two users or from the user to the frame creator in a priority queue or by marking such communications as having a higher priority than other communications received from users who may not have matched using a frame. Matching a frame may involve matching all of the subsets of the user and the frame creator of only some, or all, of the pages of a multi-page frame. For example, a match may be considered to have been made if all of the subsets are matched on 2 of 3, or 3 of 3 pages. To match a subset of a content set, the user selects the same subset as the frame creator in one embodiment, though in other embodiments, partial matches are allowed. In one embodiment, the frame creator defines elements of a subset that need not be matched. For example, a question page may ask what the person likes more, dogs, cats or hedgehogs, but may accept either or both of dog or hedgehog.

In one embodiment, matches are two-way matches, and so a match is considered to have occurred in step 270 only if the frame creator or other user being viewed had already either matched a subset or all subsets of one or all frames of the viewing user, or, if the viewing user did not have any such frames with subsets, if the frame creator or other user being viewed had accepted the viewing user, such information being stored at such time, but not used to enable communications or priority communications.

If the frame was not a match frame 270, the method continues at step 240 of FIG. 2A. If the frame was a match frame 270, but the user did not match as described above 272, the method continues at step 282 in one embodiment, or step 240 of FIG. 2A in another embodiment.

In one embodiment, step 282 follows step 274. In another embodiment, step 276 follows step 274. At step 276, a check is made for matches of other frame creators who have a frame for which the user's subset or subsets would match. In one embodiment, only those frame creators having characteristics that match the user's preferences, and for whom the characteristics of the user matches the preferences of the frame creator, are checked in step 276. Such frame creators may be those for whom the user has already seen their profile or those for whom the user may not have already seen their profile. If there are any matches 278 the user and frame creator are notified and communications may be enabled 280 and the method continues at step 282 and otherwise 278, the method continues at step 282. Communications may be enabled for both users in each pair of user and frame creator corresponding to the match, or communications may be enabled in only one direction at first. In one embodiment, communication is enabled from the frame creator to the user, and if that frame creator initiates a communication, two way communication between that frame creator and the user are enabled. In another embodiment, communications are enabled first for the user who has received the most communications and then in both directions if the first enabled user communicates with the other user. When communications are enabled or enhanced, each user may view the profile of the other user, but may not attempt to match as described herein, though they may see the subsets of that other user in any frames used for matching.

In one embodiment, at step 282, if an automatic or manual search had been made for the user and there are more frame creators or other users in the search made for the user, the next such user corresponding to the search is selected 284 and the method continues at step 240 using the newly selected user. If there are no more such users corresponding to the search, or the user was viewed without a search 282, the method continues at step 214 of FIG. 2A. In the case of a manual search, the selecting user may select another user to view at any time while viewing any other user.

Match

At step 262, if the user matches the frame creator (either because the user accepted the frame creator, or because the user accepted the frame creator and the frame creator either accepted the user or matched a subset of the user, the users are informed and communications or priority communications are enabled in a manner similar to that described above for step 274 and the method continues at step 282. If there is no such match 262, the method continues at step 282.

Search

As noted, users may manually search or a search may be automatically made for mutual compatibility between preferences and characteristics. If the action the user performs, or the action performed for the user, is a search 216, the method continues at step 290 of FIG. 2B.

At step 290, the users (who may be frame creators) and optionally other user who are not frame creators are marked if they meet a search criteria. The search criteria may be specified by the user as part of the action or the search criteria may be automatically identified, for example using a search of other users whose characteristics match the preferences of the user on whose behalf the search is being conducted, other users whose preferences match the characteristics of the user on whose behalf the search is being conducted, or users who meet both of these criteria. In one embodiment, scores are assigned to each of the marked other users. In one embodiment, a preference score is assigned to each marked user based on how well the characteristics of the marked user meet the preferences of the user on whose behalf the search is being conducted. The preference score may also be a function of how well the characteristics of such user matches the preferences of the marked user.

If the user on whose behalf the search is being conducted has made any selections of subsets, either when defining frames or when attempting to match the frame of a different frame creator 292, selections scores are also assigned to each marked user. A selection score for a user and frame creator is a function of what percentage of any subset of the frame creator or other user the user for which the search is being conducted has matched with any prior selection of a subset the user has made, even if it is not for that frame creator or other user. Thus, if there were 3 elements in a subset of the frame creator, and the highest selection the frame creator made matched two out of three such elements, the selection score is higher than if no such matches were made. In still another embodiment, if the user has selected a subset for all frames of a frame creator and did not match all of the subset of that frame creator, the selection score is a negative score and that frame creator will not be considered to match the search criteria.

A weighting of the preference and selection scores for each frame creator may be made, such as equal weighting, and the scores are summed to produce an overall score 296. The marked users are sorted and the first profile is selected for viewing as described above, or summary profiles of some or all of a first portion of the marked users are displayed in sorted order for the user to select. In one embodiment, viewing is automatic when the first profile is selected. The method continues at step 240 of FIG. 2A.

The use of a frames-based user interface can improve the user interface of the computer system that uses it. Those advantages include efficiency, as the users viewing another user can focus on the frame type or frame of interest, without requiring all of the information provided by the frame creator to be viewed, thus eliminating the need for the computer system to serve that extraneous information to the user. The user interface is improved for the viewing user because it allows access to the type of information the user wants to see, without requiring the user to sift through other information. The user interface is improved for the frame creator as it allows related information to be defined without the need for tagging the subject of the content. In the case of a communications server, the improved user interface allows the frames creator to provide an easy to implement criteria for communication. Other benefits of the user interface and the computer system itself will be readily identifiable to those skilled in the art.

System

Figure 3:
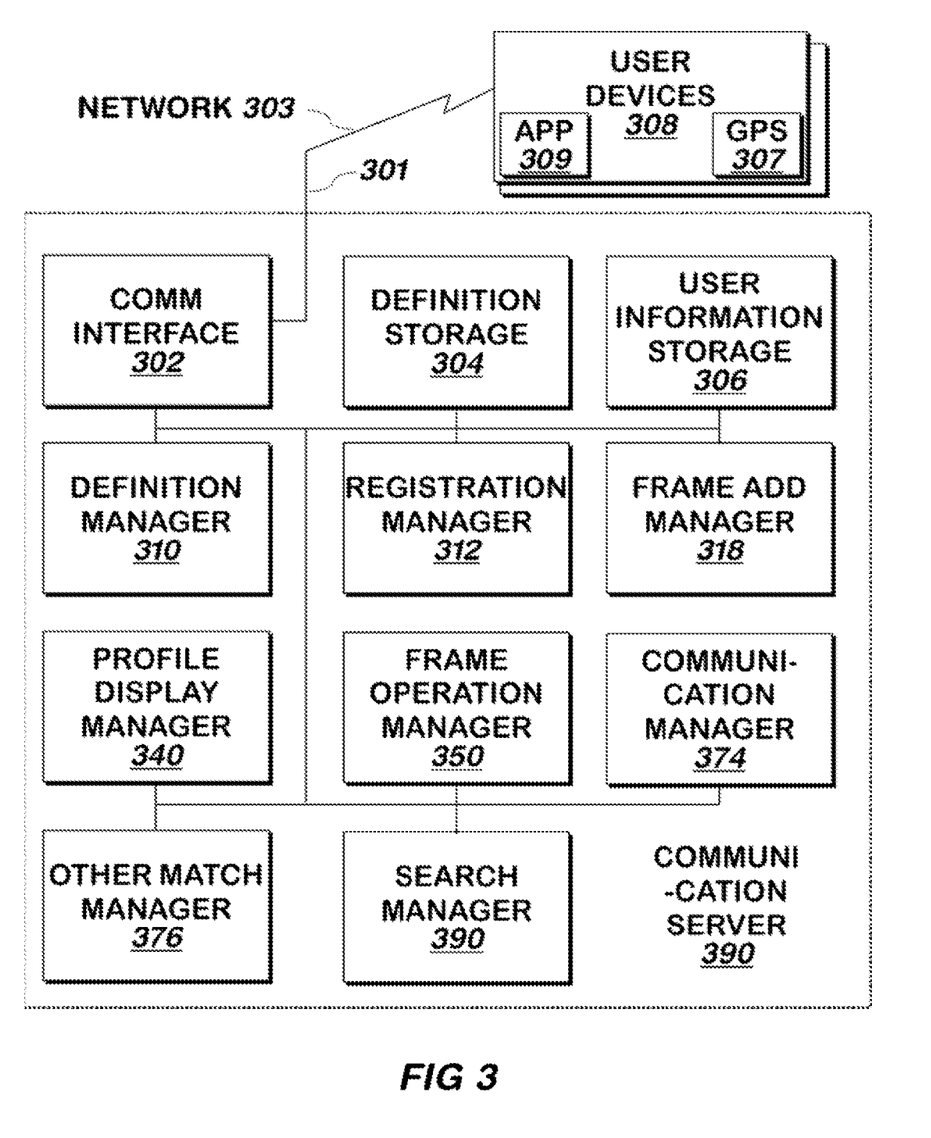
FIG. 3 is a block schematic diagram of a communications server and user devices according to one embodiment of the present invention.

Referring now to FIG. 3, a communication server 300 coupled to user devices 308 is shown according to one embodiment of the present invention. Communication interface 302 includes a conventional TCP/IP compatible communication interface, having input/output 301 coupled to a network 303, including an Ethernet network, and the networks of the Internet. User devices 308 (of which there may be thousands or tens of thousands or hundreds of thousands) may include conventional mobile devices, or conventional computer systems. In the case of mobile devices, user devices 308 include conventional GPS receivers, and an app that operates as described herein to allow communication with communication server 300, and other user devices 308 via communication server 300. Portions of the elements of the communication server may reside in either or both of communication server 300 and user devices 308, and/or app 309 provides a user interface to the user for the elements of communication server 300 as described herein and communicates with such elements to provide user responses as described herein.

Definition manager 310 receives from a system administrator frame type definition and content sets as described above, and stores them into definition storage 304, along with unique identifiers for each of the frame type, content set, and each element or component of each content set.

Registration manager 312 receives registration information from users, including characteristics and preferences, and stores such registration information into user information storage. Registration manager 312 associates such information for each user with a unique user identifier of that user in user information storage 306. Registration manager 312 also receives the current location of the users who have provided such registration information via conventional GPS receivers 307 and a conventional app in user devices 308. Such location information is received on an ongoing basis by registration manager 312, and there may be thousands or tens of thousands or hundreds of thousands of users registered, and for whom registration manager 312 receives location information on an ongoing basis.

Once the user has registered, user interface manager 314 receives commands from such users via the user devices 308 to perform a new the user actions described above. All such actions are performed as described above by communication server 300.

If the action is to add a frame, user interface manager 314 signals frame add manager 318. Frame add manager 318 receives commands (optionally via a user interface on app 309 of user devices 308) to add a frame, select one or more content sets to associate with the frame, select a subset of any content set or receive a creator added content set. Frame add manager 318 stores into user information storage 306 an identifier of the frame type, an identifier of each selected content set, identifiers of elements of the content set selected as a subset and/or the creator added content set.

If the action is to view a user, user interface manager 314 signals search manager 390 with the identifier of the user requesting the action, and search manager 390 provides profile display manager 340 with an identifier of the user whose profile should be displayed (selected as described in more detail below) and the user identifier of the viewing user. Profile display manager 340 stores the user identifier of the user whose profile should be displayed associated with the user identifier of the viewing user in user information storage 306 and displays the initial profile information, and optionally displays (optionally via app 309) a user interface element that the user can use to signal that the next user in a group of users, such as the users in a search result, should be selected and displayed, in place of the user who had been displayed. If profile display manager 340 receives an indication from the user that the next user should be displayed, profile display manager 340 signals search manager 390, described in more detail below, which provides profile display manager 340 with an identifier of the next user in the search results, and profile display manager 340 repeats the process using the newly received user identifier as the user identifier of the user to be viewed. Profile display manager 340 provides the user identifier to frame operation manager 350, which either provides thumbnails of the frames associated with such user identifier in user information storage 306, or displays the first frame associated with such user identifier in user information storage 306. Frame operation manager 350 then operates the frame as described above via a user interface it provides, displays any one or more content sets, via one or more pages and receives any selections of any content set, stores into user information storage 306 identifiers of the frame type, content set and elements of any content set selected as a subset by the viewing user, with the user identifiers, displays any additional pages as described above, and determines whether or not match has occurred between the users whose user identifiers it receives using the information in user information storage 306 associated with such user identifiers. If a match has occurred, including a two way match as described above, frame operation manager 350 provides the user identifiers it received to communication manager 374.

When it receives such user identifiers, communication manager 374 stores them into user information storage 306 as having matched, informs the users, and enables communications or priority communications for subsequent communications among the users as described above, by so indicating the user identifiers to communications manager 374, which does not enable communications unless expressly instructed. In one embodiment, communications manager includes a store and forward messaging facility, such as an e-mail or chat-like message store and forward or one for voice messages. If the users wish to communicate, and such communication or priority communications are not enabled, communication manager 374 either refuses to allow such communication, or does not provide priority communications between the two users as described above. If priority communications are enabled, or communications are enabled, communication manager 374 allows such communication between such two users using techniques such as chat, or e-mail.

In one embodiment, frame operation manager 350 provides the user identifier of the viewing user to other match manager 376, which checks for matches with other creators of the same frame type, and optionally the same content set, and if it discovers such matches it stores identifiers of the users corresponding to the match, into user information storage 306 as other users who additionally matched, and signals communication manager 374. Communication manager 374 allows such indications as described above including one-way and or two way communications, or priority communications between such additionally matched users, even though the viewing user was not viewing the profile, including any frames, of the other user in the match.

Frame operation manager 350, optionally via app 309, may also provide a user interface element allowing the viewing user to accept the user being viewed, optionally if there are no frames for which a subset has been selected for the user being viewed or such element may be provided and operated as described even if such frames exist, but require a two way match in one embodiment. If the user accepts such user being viewed, frame operation manager 350 stores the indication and user identifiers into user information storage 306 and checks for a match as described herein, and if the acceptance completes a two-way match, frame operation manager 350 signals communication manager 374 with the user identifiers of the viewing and viewed users. Frame operation manager 350 additionally either signals user-interface manager 314, which allows other actions to be performed, or if it received the user identifier with a flag described herein and below, signals search manager 390, which selects the next user in the search results.

If the action is to perform a search, including an optional search criteria, user interface manager 314 provides the identifier of the user for which the search is to be performed to search manager 390, and any search criteria as described herein. Such action may be presumed upon startup of the app 309, which so signals user interface manager 314 at app startup, and user interface manager 314 performs the automatically generated search described herein. The automatically generated search may be performed rapidly, before the users have had a chance to change positions, which could invalidate the search results, as the distances between users may be one important search criteria, and so a very rapid determination of the distances can assist the accuracy of the search. Search manager 390 marks in user information storage 306 the user identifiers of other users meeting either a manually specified search criteria, or automatically specified search criteria, and optionally assigns the preference and selection scores, and produces the overall score for each marked user as described above. Search manager 390 sorts the users with the highest overall scored user listed first.

The search criteria used to score the users may include a distance criteria that search manager 390 incorporates into the score (either using a binary in or out technique or by scoring nearer users higher than farther users or both of these), using the location information it obtains from registration manager 312 based on the GPS location information registration manager 312 receives. In one embodiment, search manager 390 provides a distance preference specified by the viewing user and the user identifier of the viewing user and registration manager 312 identifies all the users near the viewing user who meet the distance preference, and optionally, for whom the viewing user also meets a distance preference of the other user, as well as the distances between them.

Search manager 390 may either provide a list of such marked users, or a portion of such marked users, or may signal profile display manager 340 with the first such marked user, and a flag indicating that the user is being viewed from a set of search results, so that profile display manager 340 can signal search manager 390 when the next user's user identifier is to be provided as described above.

Each system element may include a conventional hardware processor or hardware processor system or processor system or processor that is coupled to a hardware memory or hardware memory system or memory or memory system, each of these being conventional in nature. The processor is specially programmed to operate as described herein. All system elements are structural: the only nonce word to be used herein is "means". Each system element described herein may include computer software or firmware running on a conventional computer system. Each system element labeled "storage" may include a conventional computer storage such as memory or disk and may include a conventional database. Each system element may contain one or more inputs, outputs and/or input/outputs to perform the functions described herein. Any system element may incorporate any of the features of the method and vice versa. System elements are coupled to one another to perform the functions described herein and may utilize data obtained in any possible manner.

Certain Embodiments

Described is a computer-implemented method of operating a message storage and forwarding system that stores and forwards messages between a first user and a second user, the method including:

providing, by a hardware computer system including a hardware memory, and receiving input from, a first one or more user interface elements to allow the first user to define a first set of two or more frames, each frame including a type selected from two or more pre-defined types, any of which are also selectable by the second user when the second user defines a second set of frames;

providing, by the hardware computer system including the hardware memory, and receiving input from, a second one or more user interface elements to allow the first user to define, and assign to at least one of the first set of the two or more frames, different sets of two or more contents each including two or more contents that are related to one another, at least a first one of the different sets of the two or more contents including a set of images, and at least a second one of the different sets of the two or more contents including a selection of one from of two or more contents in that frame;

providing, by the hardware computer system including a hardware memory, and receiving input from, a third one or more user interface elements to allow the second user to view at least some of the first set of the two or more frames while not enabling communications via the message storage and forwarding facility in two directions between the first user and the second user, and to allow the second user to select at least one of the two or more contents in at least one of the at least the second one of the different sets of the two or more contents in the first set of the two or more frames; and responsive to the at least one of the two or more contents of at least one frame selected by the second user at least corresponding to the selection of said frame, enabling, by the hardware computer system including the hardware memory, the message storage and forwarding facility to allow the first user and the second user to communicate with one another in two directions.

The method may contain additional features whereby at least one of the third one or more user interface elements to allow the user to select the at least one of the two or more contents in the at least one of the at least the second of the different sets of the two or more contents of the frame comprises at least one user interface element to allow the second user to define the second set of at least one frame, different from the first set of frames.

The method may contain additional features whereby each of the two or more contents in at least one of the frames comprises potential answers to a question.

The method may contain additional features whereby the selection is at least one of the potential answers to the question preferred by the first user.

The method may contain additional features whereby the enabling is additionally responsive to a location of a GPS receiver of at least one of: the first user and the second user.

The method may contain additional features whereby the at least one of the first set of the two or more frames to which the different sets of the two or more contents are defined and assigned by the first user comprises fewer than all of the first set of the two or more frames.

Described is a computer-based system for operating a message storage and forwarding system that stores and forwards messages between a first user and a second user, the system including:

a frame add manager for providing, and receiving input from, via an input/output a first one or more user interface elements to allow the first user to define a first set of two or more frames, each frame including a type selected from two or more pre-defined types, any of which are also selectable by the second user when the second user defines a second set of frames, and for providing and receiving input from, via the input/output, a second one or more user interface elements to allow the first user to define, and assign to at least one of the first set of the two or more frames, different sets of two or more contents each including two or more contents that are related to one another, at least a first one of the different sets of the two or more contents including a set of images, and at least a second one of the different sets of the two or more contents including a selection of one from of two or more contents in that frame, and for providing at an output definition information about the first set of the two or more frames and definition and assignment information about the different sets of the two or more contents assigned to the at least one of the first set of the two or more frames;

a frame operation manager having an input coupled to the frame add manager output for receiving the definition information about the first set of the two or more frames and the definition and assignment information about the different sets of the two or more contents assigned to the at least one of the first set of the two or more frames, the frame operation manager for providing via an input/output and receiving information from, a third one or more user interface elements to allow the second user to view at least some of the first set of the two or more frames while communications via the message storage and forwarding facility is not enabled in two directions between the first user and the second user, and to allow the second user to select at least one of the two or more contents in at least one of the at least the second one of the different sets of the two or more contents in the first set of the two or more frames responsive to at least some of the definition information about the first set of the two or more frames and definition and assignment information about the different sets of the two or more contents assigned to the at least one of the first set of the two or more frames, and for, responsive to the at least one of the two or more contents of at least one frame selected by the second user at least corresponding to the selection of said frame, providing a first signal at an output; and the message storage and forwarding facility having an input coupled to the frame operation manager output for receiving the first signal, the message storage and forwarding facility for, responsive to the signal, allowing the first user and the second user to communicate with one another in two directions, and not allowing the first user and the second user to communicate with one another in two directions prior to receiving the first signal.

The system may contain additional features whereby at least one of the third one or more user interface elements to allow the user to select the at least one of the two or more contents in the at least one of the at least the second of the different sets of the two or more contents of the frame comprises at least one user interface element to allow the second user to define the second set of at least one frame, different from the first set of frames.

The system may contain additional features whereby each of the two or more contents in at least one of the frames comprises potential answers to a question.

The system may contain additional features whereby the selection is at least one of the potential answers to the question preferred by the first user.

The system of claim 7:
additionally including:
a registration manager having an input coupled to receive GPS coordinates from two or more users including the first user and the second user, the registration manager for providing at an output location identifiers of the first user and the second user; and a search manager having an input coupled to the registration manager output for receiving the location information of the first user and the second user, the search manager for selecting the first user from at least some of the two or more users, responsive to the location information of the first user and the second user and providing the identifier of the first user at an output; and wherein:
the frame operation manager input is coupled to the search manager output for receiving the identifier of the first user; and
the frame operation manager receives the definition information responsive to the identifier of the first user received.

The system may contain additional features whereby the at least one of the first set of the two or more frames to which the different sets of the two or more contents are defined and assigned by the first user comprises fewer than all of the first set of the two or more frames.

Described is a computer program product including a computer useable medium having computer readable program code embodied therein for operating a message storage and forwarding system that stores and forwards messages between a first user and a second user, the computer program product including computer readable program code devices configured to cause a computer system to:
provide, and receive input from, a first one or more user interface elements to allow the first user to define a first set of two or more frames, each frame including a type selected from two or more pre-defined types, any of which are also selectable by the second user when the second user defines a second set of frames;
provide, and receive input from, a second one or more user interface elements to allow the first user to define, and assign to at least one of the first set of the two or more frames, different sets of two or more contents each including two or more contents that are related to one another, at least a first one of the different sets of the two or more contents including a set of images, and at least a second one of the different sets of the two or more contents including a selection of one from of two or more contents in that frame;
provide, and receive input from, a third one or more user interface elements to allow the second user to view at least some of the first set of the two or more frames while not enabling communications via the message storage and forwarding facility in two directions between the first user and the second user, and to allow the second user to select at least one of the two or more contents in at least one of the at least the second one of the different sets of the two or more contents in the first set of the two or more frames; and
responsive to the at least one of the two or more contents of at least one frame selected by the second user at least corresponding to the selection of said frame, enable the message storage and forwarding facility to allow the first user and the second user to communicate with one another in two directions.

The computer program product may contain additional features whereby at least one of the third one or more user interface elements to allow the user to select the at least one of the two or more contents in the at least one of the at least the second of the different sets of the two or more contents of the frame comprises at least one user interface element to allow the second user to define the second set of at least one frame, different from the first set of frames.

The computer program product may contain additional features whereby each of the two or more contents in at least one of the frames comprises potential answers to a question.

The computer program product may contain additional features whereby the selection is at least one of the potential answers to the question preferred by the first user.

The computer program product may contain additional features whereby the computer readable program code devices configured to cause the computer system to enable are additionally responsive to a location of a GPS receiver of at least one of: the first user and the second user.

The computer program product may contain additional features whereby the at least one of the first set of the two or more frames to which the different sets of the two or more contents are defined and assigned by the first user comprises fewer than all of the first set of the two or more frames.

What is claimed is:

1. A computer-implemented method of operating a message storage and forwarding system that stores and forwards messages between a first user and a second user, the method comprising:
providing, by a hardware computer system comprising a hardware memory, and receiving input from, a first one or more user interface elements to allow the first user to define a first set of a plurality of frames;
providing, by the hardware computer system comprising the hardware memory, and receiving input from, a second one or more user interface elements to allow the first user to define, and assign to each of at least one of the first set of the plurality of frames, different sets of a plurality of contents, each of the different sets of the plurality of contents comprising a plurality of contents that are related to one another, at least a first one of the different sets of the plurality of contents comprising a set of images, and at least a second one of the different sets of the plurality of contents comprising a selection of one from a plurality of contents assigned to a frame in the first set;
providing, by the hardware computer system comprising the hardware memory, and receiving input from, a third one or more user interface elements to allow the second user to view at least some of the first set of the plurality of frames while not enabling communications via the message storage and forwarding system in two directions between the first user and the second user, and to allow the second user to select at least one of the plurality of contents in at least one of the at least the second one of the different sets of the plurality of contents in the first set of the plurality of frames; and
responsive to the at least one of the plurality of contents in the at least one of the at least the second one of the different sets of the plurality of contents in a frame in the first set of the plurality of frames selected by the second user at least corresponding to the selection of the one from the plurality of contents assigned to said frame, enabling, by the hardware computer system comprising the hardware memory, the message storage and forwarding system to allow the first user and the second user to communicate with one another in two directions.

2. The method of claim 1, wherein at least one of the third one or more user interface elements to allow the second user to select the at least one of the plurality of contents in the at least one of the at least the second one of the different sets of the plurality of contents in the first set of the plurality of frames comprises at least one user interface element to allow the second user to define a second set of frames, different from the first set of frames.

3. The method of claim 1, wherein each of the plurality of contents in at least one of the sets of the plurality of contents assigned to at least one frame in the first set of the plurality of frames comprises potential answers to a question.

4. The method of claim 3, wherein the selection of the one from the plurality of contents comprises at least one of the potential answers to the question, wherein said at least one of the potential answers are preferred by the first user.

5. The method of claim 1, wherein the enabling is additionally responsive to a location of a GPS receiver of at least one of: the first user and the second user.

6. The method of claim 1 wherein the at least one of the first set of the plurality of frames to which the different sets of the plurality of contents are defined and assigned by the first user comprises fewer than all of the first set of the plurality of frames.

7. A computer-based system for operating a message storage and forwarding system that stores and forwards messages between a first user and a second user, the system comprising:
   a frame add manager for providing, and receiving input from, via an input/output, a first one or more user interface elements to allow the first user to define a first set of a plurality of frames, and for providing and receiving input from, via the input/output, a second one or more user interface elements to allow the first user to define, and assign to each of at least one of the first set of the plurality of frames, different sets of a plurality of contents, each of the different sets of the plurality of contents comprising a plurality of contents that are related to one another, at least a first one of the different sets of the plurality of contents comprising a set of images, and at least a second one of the different sets of the plurality of contents comprising a selection of one from of a plurality of contents assigned to a frame in the first set, and for providing at an output definition information about the first set of the plurality of frames and definition and assignment information about the different sets of the plurality of contents assigned to the at least one of the first set of the plurality of frames;
   a frame operation manager comprising a hardware computer processor coupled to a hardware memory, and having an input coupled to the frame add manager output for receiving the definition information about the first set of the plurality of frames and the definition and assignment information about the different sets of the plurality of contents assigned to the at least one of the first set of the plurality of frames, the frame operation manager for providing via an input/output and receiving information from, a third one or more user interface elements to allow the second user to view at least some of the first set of the plurality of frames while communications via the message storage and forwarding system are not enabled in two directions between the first user and the second user, and to allow the second user to select at least one of the plurality of contents in at least one of the at least the second one of the different sets of the plurality of contents in the first set of the plurality of frames responsive to at least some of the definition information about the first set of the plurality of frames and the definition and assignment information about the different sets of the plurality of contents assigned to the at least one of the first set of the plurality of frames, and for, responsive to the at least one of the plurality of contents in the at least one of the at least the second one of the different sets of the plurality of contents in a frame in the first set of the plurality of frames selected by the second user at least corresponding to the selection of the one from the plurality of contents assigned to said frame, providing a first signal at an output; and
   the message storage and forwarding system having an input coupled to the frame operation manager output for receiving the first signal, the message storage and forwarding system for, responsive to the first signal, allowing the first user and the second user to communicate with one another in two directions, and not allowing the first user and the second user to communicate with one another in two directions prior to receiving the first signal.

8. The system of claim 7, wherein at least one of the third one or more user interface elements to allow the second user to select the at least one of the plurality of contents in the at least one of the at least the second one of the different sets of the plurality of contents in the first set of the plurality of frames comprises at least one user interface element to allow the second user to define a second set of frames, different from the first set of frames.

9. The system of claim 7, wherein each of the plurality of contents in at least one of the sets of the plurality of contents assigned to at least one frame in the first set of the plurality of frames comprises potential answers to a question.

10. The system of claim 9, wherein the selection of the one from the plurality of contents comprises at least one of the potential answers to the question, wherein said at least one of the potential answers are preferred by the first user.

11. The system of claim 7:
    additionally comprising:
      a registration manager having an input coupled to receive GPS coordinates from a plurality of users comprising the first user and the second user, the registration manager for providing at an output location identifiers of the first user and the second user; and
      a search manager having an input coupled to the registration manager output for receiving the location identifiers of the first user and the second user, the search manager for selecting the first user from at least some of the plurality of users, responsive to the location identifiers of the first user and the second user and providing an identifier of the first user at an output; and
    wherein:
      the frame operation manager input is coupled to the search manager output for receiving the identifier of the first user; and
      the frame operation manager receives the definition information responsive to the identifier of the first user received.

12. The system of claim 7 wherein the at least one of the first set of the plurality of frames to which the different sets of the plurality of contents are defined and assigned by the first user comprises fewer than all of the first set of the plurality of frames.

13. A computer program product comprising a nontransitory computer useable medium having computer readable program code embodied therein for operating a message storage and forwarding system that stores and forwards messages between a first user and a second user, and configured to cause a computer system to:
    provide, and receive input from, a first one or more user interface elements to allow the first user to define a first set of a plurality of frames;
    provide, and receive input from, a second one or more user interface elements to allow the first user to define, and assign to each of at least one of the first set of the plurality of frames, different sets of a plurality of contents, each of the different sets of the plurality of contents comprising a plurality of contents that are related to one another, at least a first one of the different sets of the plurality of contents comprising a set of images, and at least a second one of the different sets of the plurality of contents comprising a selection of one from of a plurality of contents assigned to a frame in the first set;

provide, and receive input from, a third one or more user interface elements to allow the second user to view at least some of the first set of the plurality of frames while not enabling communications via the message storage and forwarding system in two directions between the first user and the second user, and to allow the second user to select at least one of the plurality of contents in at least one of the at least the second one of the different sets of the plurality of contents in the first set of the plurality of frames; and responsive to the at least one of the plurality of contents in the at least one of the at least the second one of the different sets of the plurality of contents in a frame in the first set of the plurality of frames selected by the second user at least corresponding to the selection of the one from the plurality of contents assigned to said frame, enable the message storage and forwarding system to allow the first user and the second user to communicate with one another in two directions.

14. The computer program product of claim 13, wherein at least one of the third one or more user interface elements to allow the second user to select the at least one of the plurality of contents in the at least one of the at least the second one of the different sets of the plurality of contents in the first set of the plurality of frames comprises at least one user interface element to allow the second user to define a second set of frames, different from the first set of frames.

15. The computer program product of claim 13, wherein each of the plurality of contents in at least one of the sets of the plurality of contents assigned to at least one frame in the first set of the plurality of frames comprises potential answers to a question.

16. The computer program product of claim 15, wherein the selection of the one from the plurality of contents comprises at least one of the potential answers to the question, wherein said at least one of the potential answers are preferred by the first user.

17. The computer program product of claim 13, wherein the computer readable program code devices configured to cause the computer system to enable are additionally responsive to a location of a GPS receiver of at least one of: the first user and the second user.

18. The computer program product of claim 13 wherein the at least one of the first set of the plurality of frames to which the different sets of the plurality of contents are defined and assigned by the first user comprises fewer than all of the first set of the plurality of frames.

\* \* \* \* \*